(12) United States Patent
Houchi

(10) Patent No.: US 9,014,235 B2
(45) Date of Patent: Apr. 21, 2015

(54) COMMUNICATION APPARATUS

(71) Applicant: Sony Corporation, Tokyo (JP)

(72) Inventor: Suguru Houchi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/073,362

(22) Filed: Nov. 6, 2013

(65) Prior Publication Data

US 2014/0169413 A1  Jun. 19, 2014

(30) Foreign Application Priority Data

Dec. 14, 2012  (JP) ................................. 2012-273560

(51) Int. Cl.
*H04B 1/709* (2011.01)
(52) U.S. Cl.
CPC ...................... *H04B 1/709* (2013.01)
(58) Field of Classification Search
USPC ......................................... 375/150, 140, 137
See application file for complete search history.

(56) References Cited

U.S. PATENT DOCUMENTS 6,567,480 B1 * 5/2003 Brardjanian et al. .......... 375/331
8,692,713 B2 * 4/2014 Tanaka et al. ............ 342/357.74

FOREIGN PATENT DOCUMENTS

JP  2005-204079  7/2005

* cited by examiner

*Primary Examiner* — Michael Neff
(74) *Attorney, Agent, or Firm* — Rader, Fishman & Grauer PLLC

(57) ABSTRACT

A communication apparatus includes a Doppler shift amount calculation unit configured to calculate a Doppler shift amount of a reception signal which is received from an artificial satellite and is obtained by modulating a signal, for which spectrum spreading is performed by using a predetermined spread code, by a predetermined carrier frequency, a sampling interval setting unit configured to set a sampling interval, at which down sampling is performed for the reception signal, a down sampling unit configured to perform the down sampling for the reception signal, a coherent addition unit configured to perform coherent addition of the reception signal, a spread code generation unit configured to generate a spread code, and a phase detection unit configured to perform correlation calculation between a calculation result of the coherent addition and the spread code and detects a phase of the spread code of the reception signal.

8 Claims, 14 Drawing Sheets

COMMUNICATION APPARATUS

CROSS REFERENCE TO RELATED APPLICATIONS

This application claims the benefit of Japanese Priority Patent Application JP 2012-273560 filed Dec. 14, 2012, the entire contents of which are incorporated herein by reference.

BACKGROUND

The present disclosure relates to a communication apparatus and particularly to a communication apparatus that uses a satellite navigation system such as a GPS (global positioning system).

In a GPS (global positioning system), by Doppler effect associated with a movement of an artificial satellite (hereinafter, referred to as GPS satellite) or a communication apparatus that receives a signal (hereinafter, referred to as a GPS signal) from the GPS satellite, a frequency of the GPS signal received by the communication apparatus varies, that is, a Doppler shift is generated. Due to the Doppler shift, there is a fear that accuracy of synchronous acquisition of the GPS signal performed by the communication apparatus may degrade.

In view of this, in related art, there has been proposed that a sampling frequency of an A/D converter that performs A/D conversion for a GPS signal in consideration of an error of an internal clock or a Doppler shift amount is set, thereby correcting a deviation of a chip rate of a C/A code used for spectrum spreading of the GPS signal (see, for example, Japanese Patent Application Laid-open No. 2005-204079).

SUMMARY

However, in the case where a sampling frequency of the A/D converter is changed, parts that perform processes other than synchronous acquisition are affected. Therefore, there is a fear that the structure and process of the apparatus may be complicated.

In view of the above-mentioned circumstances, it is desirable to increase the accuracy of synchronous acquisition of a reception signal from an artificial satellite such as a GPS satellite with a simple structure.

According to an embodiment of the present disclosure, there is provided a communication apparatus including a Doppler shift amount calculation unit, a sampling interval setting unit, a down sampling unit, a coherent addition unit, a spread code generation unit, and a phase detection unit. The Doppler shift amount calculation unit is configured to calculate a Doppler shift amount of a reception signal which is received from an artificial satellite and is obtained by modulating a signal, for which spectrum spreading is performed by using a predetermined spread code, by a predetermined carrier frequency. The sampling interval setting unit is configured to set a sampling interval, at which down sampling is performed for the reception signal that is subjected to A/D conversion, on the basis of the Doppler shift amount calculated. The down sampling unit is configured to perform the down sampling for the reception signal that is subjected to the A/D conversion at the sampling interval set. The coherent addition unit is configured to perform coherent addition of the reception signal that is subjected to the down sampling. The spread code generation unit is configured to generate a spread code. The phase detection unit is configured to perform correlation calculation between a calculation result of the coherent addition and the spread code generated and detect a phase of the spread code of the reception signal on the basis of a result of the correlation calculation.

The sampling interval setting unit may set an average value of the sampling interval to be (the carrier frequency/(the carrier frequency+the Doppler shift amount)) times the sampling interval in the case where a Doppler shift is not generated.

The sampling interval setting unit may set a count width to be (the carrier frequency+the Doppler shift amount)/the carrier frequency, and the down sampling unit may integrate a count value by the count width for each sample of the reception signal, perform sampling of the reception signal when the count value becomes equal to or larger than a predetermined value, and start counting from a remainder obtained by subtracting the predetermined value from the count value.

The communication apparatus may further include a frequency shift amount setting unit and a frequency conversion unit. The frequency shift amount setting unit is configured to set a frequency shift amount for shifting a frequency of the reception signal on the basis of the Doppler shift amount calculated. The frequency conversion unit is configured to shift the frequency of the reception signal by the frequency shift amount set. The down sampling unit may perform the down sampling for the reception signal the frequency of which is shifted.

The communication apparatus may further include an A/D conversion unit configured to perform the A/D conversion for the reception signal. The frequency conversion unit may shift the frequency of the reception signal for which the A/D conversion is performed.

The communication apparatus may further include an intermediate frequency conversion unit configured to convert the frequency of the reception signal from the carrier frequency to a predetermined intermediate frequency. The A/D conversion unit may perform the A/D conversion for the reception signal the frequency of which is converted to the intermediate frequency, and the frequency conversion unit may shift the frequency of the reception signal, for which the A/D conversion is performed, by a frequency obtained by combining the intermediate frequency and the Doppler shift amount.

In the embodiment of the present disclosure, the Doppler shift amount of the reception signal which is received from the artificial satellite and is obtained by modulating the signal, for which spectrum spreading is performed by using a predetermined spread code, is calculated by a predetermined carrier frequency. On the basis of the Doppler shift amount calculated, a sampling interval is set, at which down sampling is performed for the reception signal that is subjected to A/D conversion. The down sampling for the reception signal that is subjected to the A/D conversion is performed at the sampling interval set. The coherent addition of the reception signal that is subjected to the down sampling is performed. The spread code is generated. The correlation calculation between a calculation result of the coherent addition and the spread code generated is performed, and the phase of the spread code of the reception signal is detected on the basis of a result of the correlation calculation.

According to the embodiment of the present disclosure, it is possible to increase the accuracy of the synchronous acquisition of the reception signal from the artificial satellite such as the GPS satellite with the simple structure.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, an embodiment of the present disclosure will be described. It should be noted that the description will be given in the following order.
1. Embodiment
2. Modified example
<1. Embodiment>

Figure 1:
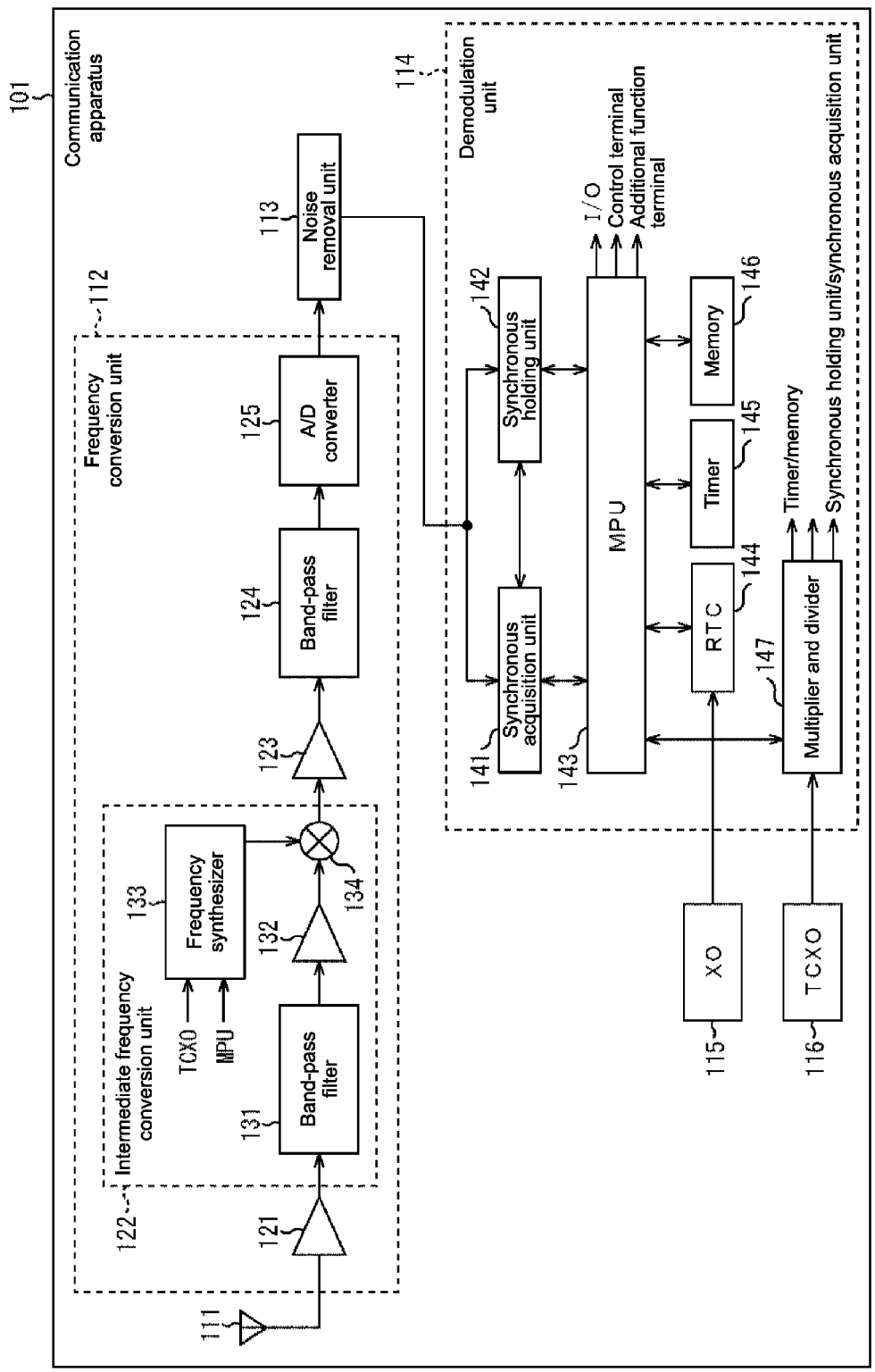
FIG. 1 is a block diagram showing an example of the structure of a communication apparatus according to an embodiment of the present disclosure.

FIG. 1 is a block diagram showing an example of the structure of a communication apparatus 101 according to an embodiment of the present disclosure. The communication apparatus 101 is provided with a communication antenna 111, a frequency conversion unit 112, a noise removal unit 113, a demodulation unit 114, an XO (crystal oscillator) 115, and a TCXO (temperature compensated crystal oscillator) 116.

The communication antenna 111 receives an RF signal (hereinafter, also referred to as GPS signal) transmitted from the GPS satellite.

Here, the GPS signal is a signal obtained by performing spectrum spreading for transmission data such as a navigation message by a spread code, multiplying an obtained spectrum spreading signal by a carrier, and performing a BPSK (binary phase shift keying) modulation. Further, as the spread code used for the spectrum spreading, a pseudo-random noise code (PN code) called as a 1023 chip C/A code is used. Each GPS satellite has an individual C/A code assigned thereto.

The frequency conversion unit 112 performs down conversion for a frequency Frf of the GPS signal received by the communication antenna 111 into an intermediate frequency Fif, thereby converting the GPS signal to an IF signal (intermediate frequency signal). Then, the frequency conversion unit 112 performs discretization on the basis of an analog IF signal to output a discretization signal. Hereinafter, an example of the structure of the frequency conversion unit 112 will be described.

(Example of Structure of Frequency Conversion Unit 112)

The frequency conversion unit 112 is provided with an LNA (low noise amplifier) 121, an intermediate frequency conversion unit 122, an amplifier 123, a BPF (band-pass filter) 124, and an A/D converter 125.

The LNA 121 amplifies the GPS signal received by the communication antenna 111.

The intermediate frequency conversion unit 122 performs down conversion for the frequency of the GPS signal amplified by the LNA 121 to the intermediate frequency Fif of 4.092 MHz, 1.023 MHz, or the like, which is lower than a carrier frequency, so that digital signal processing is easily performed. Here, an example of the structure of the intermediate frequency conversion unit 122 will be described.

(Example of Structure of Intermediate Frequency Conversion Unit 122)

The intermediate frequency conversion unit 122 is provided with a BPF (band-pass filter) 131, an amplifier 132, a frequency synthesizer 133, and a mixer 134.

For the amplified GPS signals output from the LNA 121, the BPF 131 causes only signals in a specific frequency band to pass therethrough and attenuates signals in the other band.

The amplifier 132 amplifies the GPS signal output from the BPF 131. Here, the amplifier 132 can be formed of a MOS-FET (metal oxide semiconductor field effect transistor) differential amplifier but is not limited to this.

The frequency synthesizer 133 generates a local oscillation signal having a predetermined frequency on the basis of an oscillation signal supplied from the TCXO 116 (described later). Here, the frequency synthesizer 133 is controlled by an MPU 143 provided to the demodulation unit 114 but is not limited to this. A controller (not shown) may control the frequency synthesizer 133.

The mixer 134 multiplies the amplified GPS signals output from the amplifier 132 by the local oscillation signal output from the frequency synthesizer 133. When the mixer 134 multiplies the GPS signal and the local oscillation signal together, it is possible to output the IF signal obtained by performing the down conversion to the intermediate frequency Fif, which is lower than the carrier frequency, in accordance with the local oscillation signal.

With the structure as described above, the intermediate frequency conversion unit 122 outputs the IF signal obtained by performing the down conversion for the frequency of the GPS signal to the intermediate frequency.

The amplifier 123 amplifies the IF signal output from the intermediate frequency conversion unit 122. Here, the amplifier 123 can be formed of an operational amplifier, for example, but is not limited to this.

For the amplified IF signals output from the amplifier 123, the BPF 124 causes only signals in a specific frequency band to pass therethrough and attenuates signals in the other band. It should be noted that, in the communication apparatus according to the embodiment of the present disclosure, the BPF 124 can also be formed of a low-pass filter that attenuates a signal having a frequency larger than a cutoff frequency. The signals processed from the LNA 121 to the BPF 124 are analog signals.

The A/D converter 125 performs the discretization on the basis of the analog IF signal output from the BPF 124 to output a discretization signal. The A/D converter 125 is formed of an A/D converter having a resolution of N bit, for example, and sets an average amplitude of constant thermal noise to a lower M bit of the A/D converter 125. Thus, the A/D converter 125 can prevent saturation of an output spectrum of the A/D converter due to exogenous noise, and the exogenous noise can be reliably removed in the noise removal unit 113 provided on a rear stage of the A/D converter 125.

With the structure described above, the frequency conversion unit 112 can obtain the IF signal obtained by performing the down conversion for the frequency Frf of the GPS signal received by the communication antenna 111 to the intermediate frequency Fif and output the discretization signal as a digital signal.

On the basis of the discretization signal output from the frequency conversion unit 112, the noise removal unit 113 detects the exogenous noise with respect to the discretization signal and removes the exogenous noise.

On the basis of the discretization signal output from the noise removal unit 113, the demodulation unit 114 detects a spectrum spreading signal and demodulates the spectrum spreading signal detected. Hereinafter, an example of the structure of the demodulation unit 114 will be described.

(Example of Structure of Demodulation Unit 114)

The demodulation unit 114 is provided with a synchronous acquisition unit 141, a synchronous holding unit 142, an MPU 143, an RTC (real time clock) 144, a timer 145, a memory 146, and a multiplier and divider 147.

The synchronous acquisition unit 141 performs synchronous acquisition for a C/A code in the discretization signal output from the noise removal unit 113 on the basis of a multiplied or divided oscillation signal supplied from the multiplier and divider 147 under control of the MPU 143. Along with the synchronous acquisition of the C/A code, the synchronous acquisition unit 141 detects a carrier frequency in the discretization signal output from the noise removal unit 113 and apparatus identification information (for example, a satellite number for identifying the GPS satellite) that indicates a GPS satellite as a transmission source of the GPS signal. Then, the synchronous acquisition unit 141 supplies a phase of the detected C/A code, the carrier frequency, and the apparatus identification information to the synchronous holding unit 142 and the MPU 143.

The synchronous holding unit 142 performs synchronous holding of the C/A code in the discretization signal output from the noise removal unit 113 and the carrier on the basis of the multiplied or divided oscillation signal supplied from the multiplier and divider 147 and the various pieces of information (the phase of the C/A code, the carrier frequency, and the apparatus identification information) transmitted from the synchronous acquisition unit 141 under the control of the MPU 143. Further, along with the synchronous holding, the synchronous holding unit 142 demodulates the data included in the discretization signal output from the noise removal unit 113. The synchronous holding unit 142 starts processing with the phase of the C/A code, the carrier frequency, and the apparatus identification information transmitted from the synchronous acquisition unit 141 as initial values.

In addition, the synchronous holding unit 142 transmits the detected C/A code phase, the carrier frequency, and the demodulated data to the MPU 143. It should be noted that the synchronous holding unit 142 can perform the synchronous holding in parallel for the discretization signals corresponding to transmission signals transmitted from a plurality of GPS satellites. In addition, as the synchronous holding unit 142, for example, a technology disclosed in Japanese Patent Application Laid-open No. 2003-232844 can be used, but another technique may be used.

The MPU 143 performs a processing on the basis of the phase of the C/A code, the carrier frequency, and the data transmitted from the synchronous holding unit 142. For example, the MPU 143 performs various arithmetic processings relating to the GPS, for example, calculates the position and speed of the communication apparatus 101 and corrects time information of the communication apparatus 101 on the basis of time information of the GPS satellites obtained from the demodulated data.

Further, the MPU 143 can also control the respective units of the communication apparatus 101 and perform control relating to an input to and an output from an external apparatus, for example. In the above-mentioned case, the MPU 143 functions as a control unit (not shown) in the communication apparatus 101.

The RTC 144 performs timing on the basis of the oscillation signal supplied from the XO 115. The time information obtained by the RTC 144 is substituted until when the time information of the GPS satellite is obtained, for example. When the time information of the GPS satellite is obtained, the MPU 143 controls the timer 145 to correct the information as appropriate.

The timer 145 is used to generate various timing signals for controlling operations of the units of the communication apparatus 101 in the MPU 143 or to refer to the time, for example.

The memory 146 is formed of a ROM and a RAM, for example. In the ROM that forms the memory 146, control data such as a program and a calculation parameter which is used by the MPU 143 is recorded. Further, in the RAM, a program and the like executed by the MPU 143 are temporarily stored.

The multiplier and divider 147 multiplies or divides the oscillation signal supplied from the TCXO 116.

With the structure as described above, the demodulation unit 114 can detect a spectrum spreading signal and demodulate the signal on the basis of the discretization signal transmitted from the noise removal unit 113.

The XO 115 generates an oscillation signal having a predetermined oscillation frequency of 32.768 kHz, for example. Then, the XO 115 supplies the generated oscillation signal to the RTC 144.

The TCXO 116 generates an oscillation signal having a frequency of 18.414 MHz or the like, which is different from the frequency of the oscillation signal generated by the XO 115. Then, the TCXO 116 supplies the generated oscillation signal to the multiplier and divider 147, the frequency synthesizer 133, or the like.

(Example of Structure of Synchronous Acquisition Unit 141)

Figure 2:
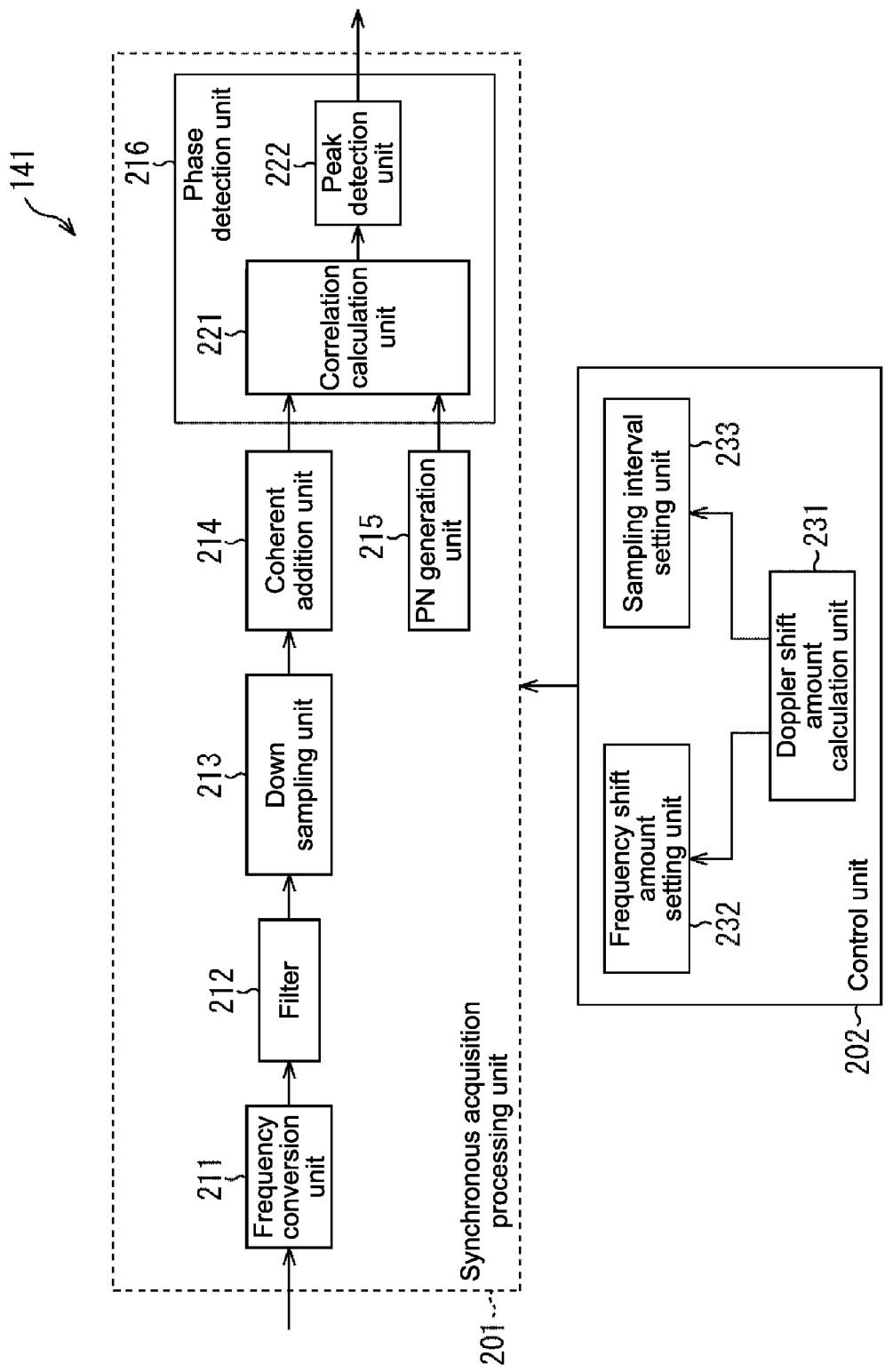
FIG. 2 is a block diagram showing an example of the structure of a synchronous acquisition unit.

FIG. 2 is a block diagram showing an example of the structure of the synchronous acquisition unit 141. The synchronous acquisition unit 141 is provided with a synchronous acquisition processing unit 201 and a control unit 202. An example of the structure of the synchronous acquisition processing unit 201 will be described.

(Example of Structure of Synchronous Acquisition Processing Unit 201)

The synchronous acquisition processing unit 201 is provided with a frequency conversion unit 211, a filter 212, a down sampling unit 213, a coherent addition unit 214, a PN generation unit 215, and a phase detection unit 216.

The frequency conversion unit 211 performs the down conversion for a frequency of the discretization signal supplied from the noise removal unit 113 so that a center frequency thereof becomes approximately 0 Hz. Specifically, the frequency conversion unit 211 shifts the frequency of the discretization signal by a frequency shift amount Fsft set by a frequency shift amount setting unit 232 of the control unit 202. The frequency conversion unit 211 supplies, to the filter 212, the discretization signal (hereinafter, referred to as baseband signal) the frequency of which is converted.

The filter 212 is formed of a low-pass filter, for example, and removes a harmonic component with a predetermined frequency or more of the baseband signal to be supplied to the down sampling unit 213.

The down sampling unit 213 performs the down sampling for the baseband signal at sampling intervals Is set by a sampling interval setting unit 233 of the control unit 202. Then, the down sampling unit 213 supplies the baseband signal that has been subjected to the down sampling to the coherent addition unit 214.

The coherent addition unit 214 performs coherent addition of the baseband signal that has been subjected to the down sampling. That is, the coherent addition unit 214 sections the baseband signal that has been subjected to the down sampling on a 1023-bit basis corresponding to the chip length (1023 chips) of the C/A codes and performs integrating for each bit corresponding to the values of data of a plurality of sections. The coherent addition unit 214 supplies data (hereinafter, referred to as coherent addition data) that indicates a calculation result of the coherent addition to a correlation calculation unit 221.

The PN generation unit 215 generates and supplies the C/A code of each GPS satellite to the correlation calculation unit 221 while shifting the phases of the generated C/A codes.

The phase detection unit 216 detects the phase of the C/A code in the baseband signal. The phase detection unit 216 is constituted of the correlation calculation unit 221 and a peak detection unit 222.

The correlation calculation unit 221 performs correlation calculation for the coherent addition data supplied from the coherent addition unit 214 and the C/A code supplied from the PN generation unit 215 and supplies a correlation value thus obtained to the peak detection unit 222.

The peak detection unit 222 detects a peak of the correlation value, thereby detecting a kind and a phase of the C/A code. That is, the peak detection unit 222 detects a peak at which the correlation value supplied from the correlation calculation unit 221 becomes a predetermined threshold value or more and detects the kind and phase of the C/A code at that time. Further, the peak detection unit 222 detects a GPS satellite as a transmission source of the GPS signal for which the synchronous acquisition is performed from the kind of the C/A code detected. Then, the peak detection unit 222 supplies the phase of the C/A code detected and the apparatus identification information that indicates the detected GPS satellite to the synchronous holding unit 142 and the MPU 143.

The control unit 202 controls processings of units of the synchronous acquisition processing unit 201. For example, the control unit 202 can be formed of the MPU 143 or can be formed separately from the MPU 143. An example of the structure of the control unit 202 will be described.

(Example of Structure of Control Unit 202)

The control unit 202 is provided with at least a Doppler shift amount calculation unit 231, the frequency shift amount setting unit 232, and the sampling interval setting unit 233.

The Doppler shift amount calculation unit 231 calculates a Doppler shift amount of the GPS signal from the GPS satellite to be subjected to the synchronous acquisition. More specifically, on the basis of ephemeris data from the GPS satellite, the Doppler shift amount calculation unit 231 calculates the Doppler shift amount of the GPS signal at a time and a position of the communication apparatus 101 when the synchronous acquisition is started and a change amount of the Doppler shift amount per unit time. Then, the Doppler shift amount calculation unit 231 supplies the calculated Doppler shift amount and the change amount of the Doppler shift amount per unit time to the frequency shift amount setting unit 232 and the sampling interval setting unit 233.

It should be noted that, hereinafter, the Doppler shift amount calculated by the Doppler shift amount calculation unit 231 at the time when the synchronous acquisition is started is referred to as an initial Doppler shift amount Fds0, and the change amount of the Doppler shift amount per unit time is referred to as a Doppler shift change amount $\Delta$Fds.

The frequency shift amount setting unit 232 supplies, at a predetermined timing, the initial Doppler shift amount Fds0, the Doppler shift change amount $\Delta$Fds, the intermediate frequency Fif, a sampling frequency Fsmp of the A/D converter 125, and the like to the frequency conversion unit 211. As a result, the frequency shift amount Fsft of the frequency conversion unit 211 is set as will be described later.

The sampling interval setting unit 233 calculates a count width $\Delta$C for setting the sampling interval Is on the basis of the initial Doppler shift amount Fds0. Then, the sampling interval setting unit 233 supplies the calculated count width $\Delta$C and a reference sampling interval Is0 to the down sampling unit 213. As a result, the sampling interval Is of the down sampling unit 213 is set.

Here, the reference sampling interval Is0 refers to a sampling interval of the down sampling unit 213 in the case where a Doppler shift is not generated. For example, in the case where the sampling frequency Fsmp of the A/D converter 125 is 16.368 giga sample/sec, the reference sampling interval Is0 is set to 16 bits. Therefore, in this case, when the down sampling is performed at the reference sampling interval Is0, the baseband signal is subjected to the down sampling to 1023 mega sample/sec.

(Example of Structure of Frequency Conversion Unit 211)

Figure 3:
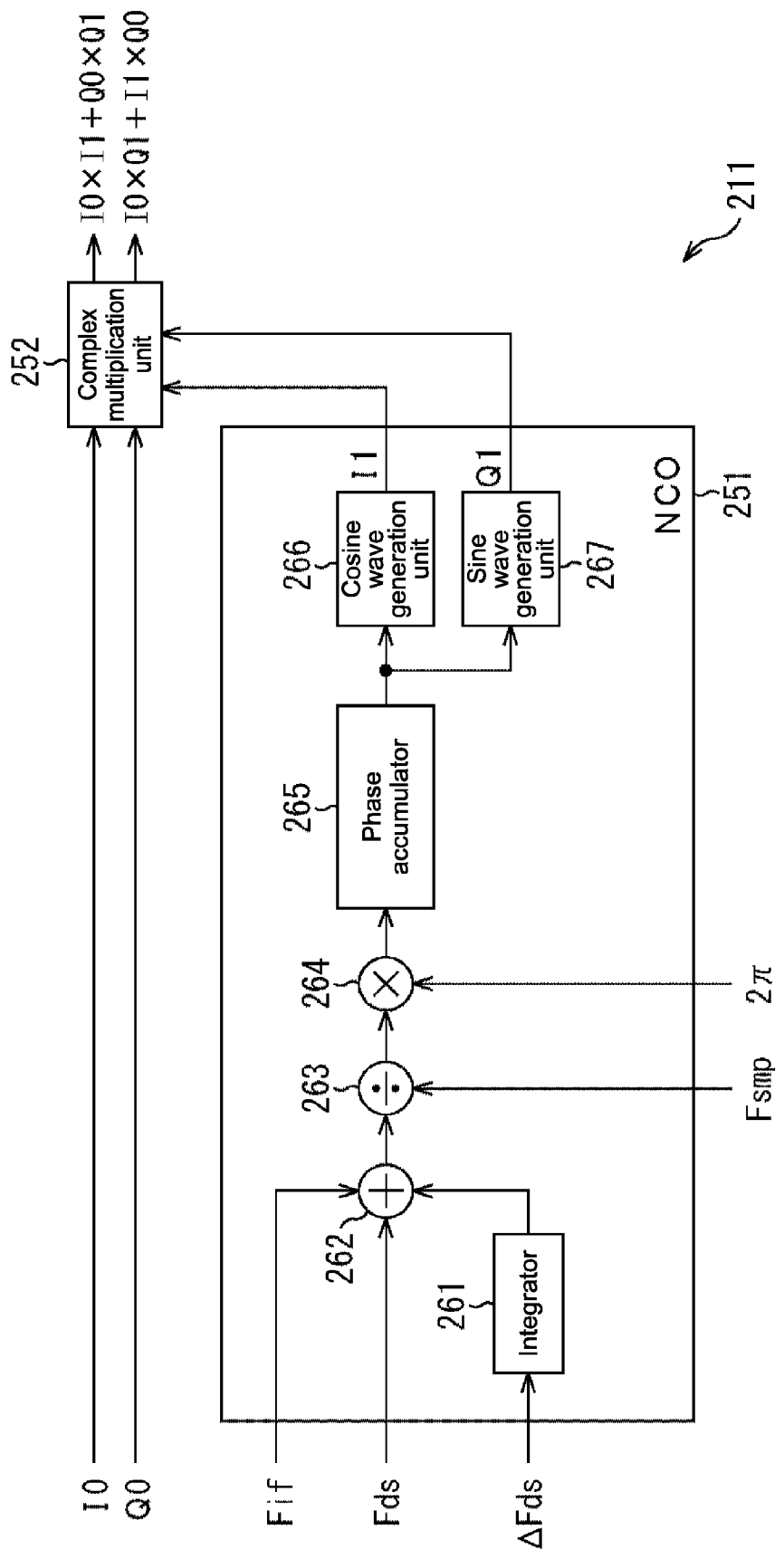
FIG. 3 is a block diagram showing an example of the structure of a frequency conversion unit.

FIG. 3 is a block diagram showing an example of the structure of the frequency conversion unit 211. The frequency conversion unit 211 is provided with an NCO (numerical controlled oscillator) 251 and a complex multiplication unit 252. An example of the structure of the NCO 251 will be described.

(Example of Structure of NCO 251)

The NCO 251 is provided with an integrator 261, an addition unit 262, a division unit 263, a multiplication unit 264, a phase accumulator 265, a cosine wave generation unit 266, and a sine wave generation unit 267.

The integrator 261 performs integrating the Doppler shift change amount $\Delta$Fds each time the frequency shift amount setting unit 232 supplies the Doppler shift change amount $\Delta$Fds. Then, the integrator 261 supplies the integrated value to the addition unit 262. Thus, from the integrator 261, n*$\Delta$Fds (n=0, 1, 2, 3, . . . ) is output.

The addition unit 262 adds the intermediate frequency Fif supplied from the frequency shift amount setting unit 232, the initial Doppler shift amount Fds0, and the integrated value supplied from the integrator 261 and supplies an addition value thus obtained to the division unit 263. The addition value is the frequency shift amount Fsft described above. Therefore, the frequency shift amount Fsft is Fif+Fds0+n*$\Delta$Fds (n=0, 1, 2, 3, . . . ).

The division unit 263 divides the frequency shift amount Fsft supplied from the addition unit 262 by the sampling frequency Fsmp supplied from the frequency shift amount setting unit 232 and supplies a division value thus obtained to the multiplication unit 264. Thus, from the division unit 263, Fsft/Fsmp is output.

The multiplication unit 264 multiplies the division value supplied from the division unit 263 by $2\pi$ as a constant supplied from the frequency shift amount setting unit 232 and supplies a multiplication value thus obtained to the phase accumulator 265. It should be noted that the multiplication value is referred to as a phase width $\Delta\theta$. Thus, the phase width $\Delta\theta$ is $2\pi$*Fsft/Fsmp. The phase width $\Delta\theta$ is a phase difference between samples of a cosine wave output from the cosine wave generation unit 266 and a sine wave output from the sine wave generation unit 267.

The phase accumulator 265 integrates the phase width $\Delta\theta$ each time the sample value is output from the cosine wave generation unit 266 and the sine wave generation unit 267 and supplies a phase $\theta$ as the integration value thus obtained to the cosine wave generation unit 266 and the sine wave generation unit 267. Therefore, the phase e is increased in a manner like $0, \Delta\theta, 2\Delta\theta, 3\Delta\theta, \ldots$ for each sample.

The cosine wave generation unit 266 outputs a cosine value $\cos\theta$ corresponding to the phase $\theta$ supplied from the phase accumulator 265. Therefore, from the cosine wave generation unit 266, a discretization signal I1 of such a cosine wave that the frequency coincides with the frequency shift amount Fsft (=Fif+Fds0 +n*$\Delta$Fds) is output.

The sine wave generation unit 267 outputs a sine value $\sin\theta$ corresponding to the phase $\theta$ supplied from the phase accumulator 265. Accordingly, from the sine wave generation unit 267, a discretization signal Q1 of such a sine wave that the frequency coincides with the frequency shift amount Fsft (=Fif+Fds0+n*$\Delta$Fds) is output.

The complex multiplication unit 252 performs complex multiplication for the discretization signal supplied from the noise removal unit 113 and the discretization signal supplied from the NCO 251. Specifically, in the case where a Q component of the discretization signal supplied from the noise removal unit 113 is set as Q0, and an I component thereof is set as I0, the complex multiplication unit 252 calculates I0*I1+Q0*Q1, outputs a calculated value as the I component, calculates I0*Q1+I1*Q0, and outputs a calculated value as the Q component. As a result, from the complex multiplication unit 252, the baseband signal obtained by shifting the frequency of the discretization signal by the frequency shift amount Fsft is output.

(Example of Structure of Down Sampling Unit 213)

Figure 4:
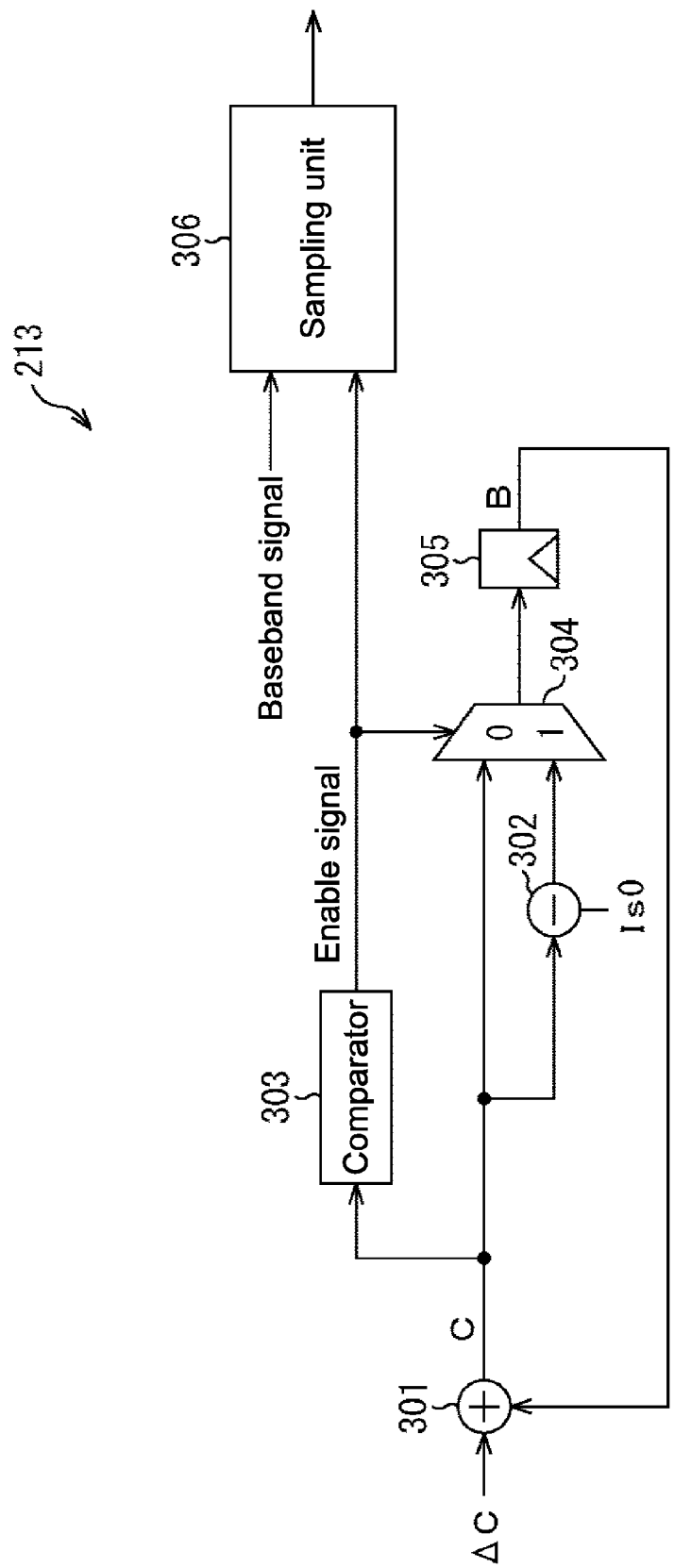
FIG. 4 is a block diagram showing an example of the structure of a down sampling unit.

FIG. 4 is a block diagram showing an example of the structure of the down sampling unit 213. The down sampling unit 213 is provided with an addition unit 301, a subtraction unit 302, a selector 304, a buffer 305, and a comparator 303.

The addition unit 301 adds the count width $\Delta C$ supplied from the sampling interval setting unit 233 to a buffer value B of the buffer 305 and supplies a count value C thus obtained to the comparator 303 and the selector 304.

The subtraction unit 302 subtracts a reference sampling interval Is0 supplied from the sampling interval setting unit 233 from the count value C and supplies a subtraction value C−Is0 thus obtained to the selector 304.

The comparator 303 compares the count value C with the reference sampling interval Is0. Then, in the case where the counter value C is equal to or more than the reference sampling interval Is0, the comparator 303 sets an enable signal value to 1 (High level). In the case where the count value C is less than the reference sampling interval Is0, the comparator 303 sets the enable signal value to 0 (Low level).

In the case where the enable signal output from the comparator 303 is 0, the selector 304 supplies the count value C supplied from the addition unit 301 to the buffer 305. In the case where the enable signal is 1, the selector 304 supplies the subtraction value C−Is0 supplied from the subtracter 302 to the buffer 305.

The buffer 305 holds a latest value of the value supplied from the selector 304 and supplies the buffer value B held to the addition unit 301.

The sampling unit 306 does not output a value when the enable signal is 0, and outputs a value of the baseband signal when the enable signal becomes 1. As a result, the value of the baseband signal is thinned out. That is, the baseband signal is subjected to the down sampling.

(Details of Synchronous Acquisition Process)

Figure 5:
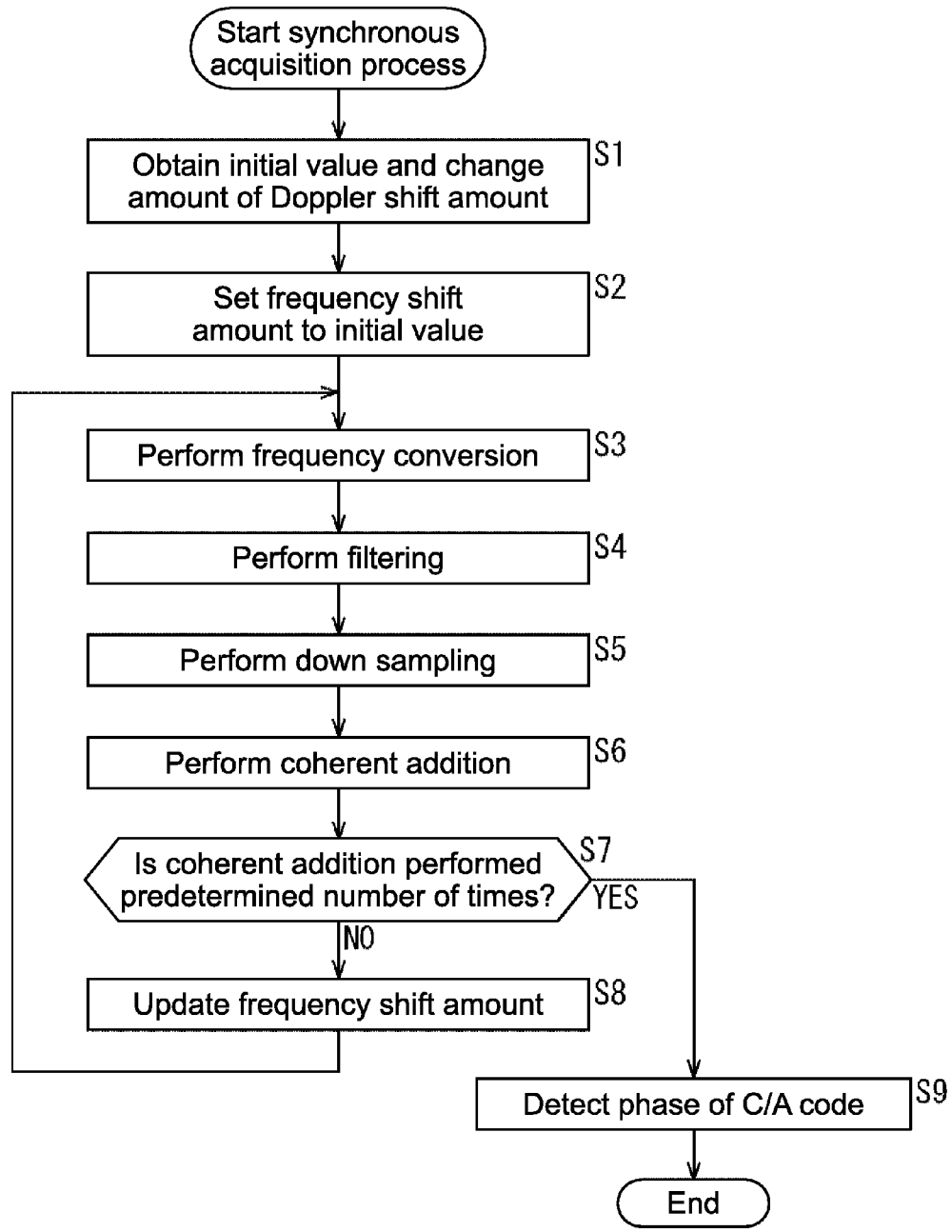
FIG. 5 is a flowchart for explaining a synchronous acquisition process.

Subsequently, with reference to the flowchart of FIG. 5, details of the synchronous acquisition process performed by the synchronous acquisition unit 141 will be described.

In Step S1, the Doppler shift amount calculation unit 231 obtains an initial value and a change value of the Doppler shift amount. Here, with reference to FIGS. 6 to 8, a time-series transition of the Doppler shift amount will be simply described.

Figure 6:
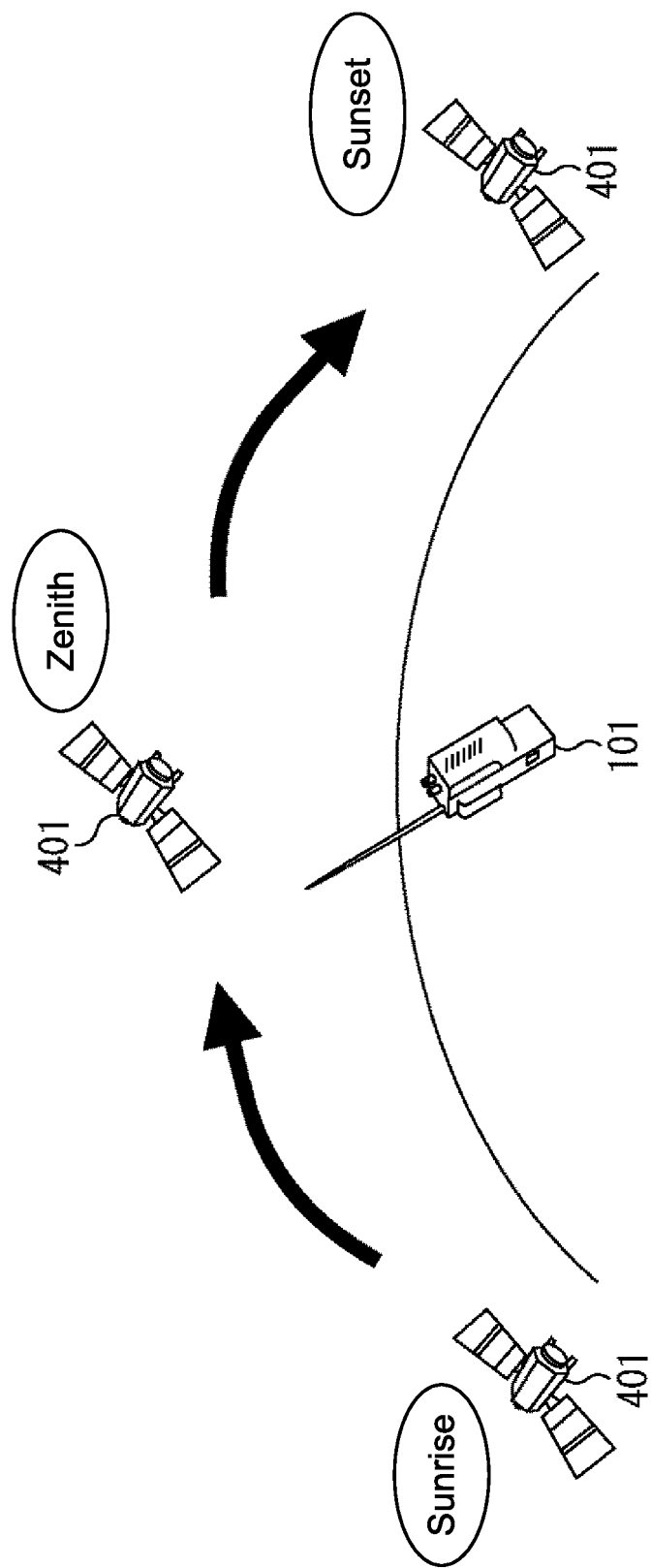
FIG. 6 is a diagram for explaining a Doppler shift.
Figure 7:
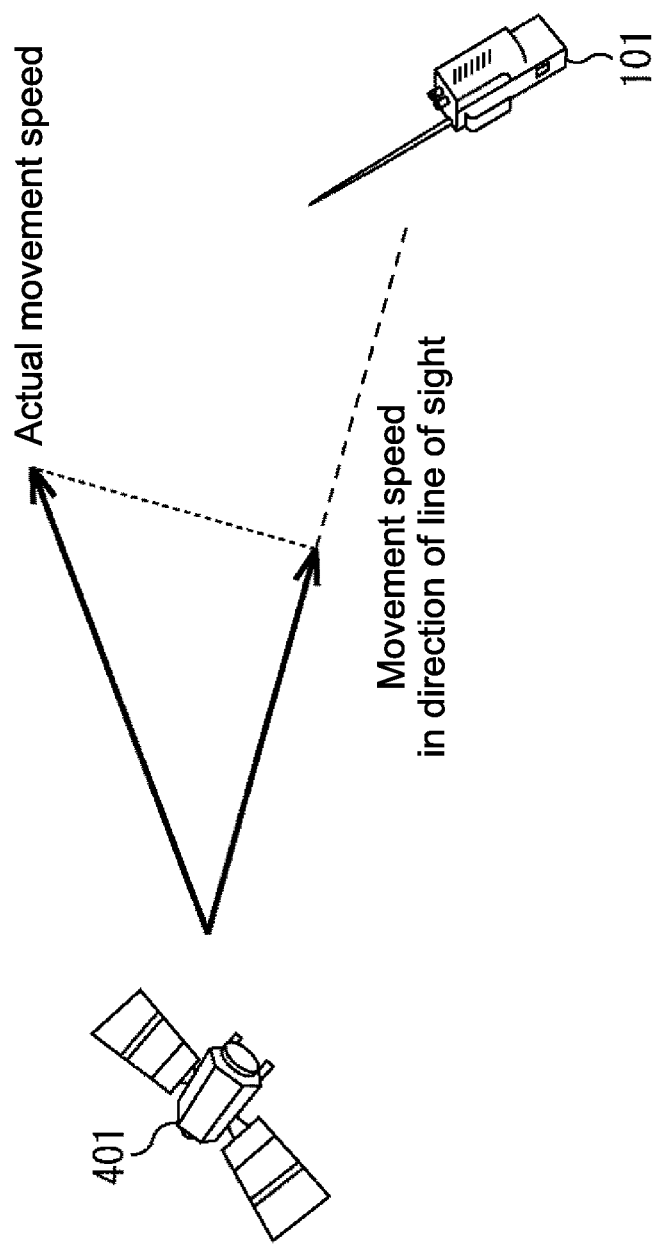
FIG. 7 is a diagram for explaining the Doppler shift.

As schematically shown in FIG. 6, a GPS satellite 401 takes a semi-synchronous orbit and seems to constantly move when viewed from the communication apparatus 101. Further, as shown in FIG. 7, out of a movement speed (relative speed) of the GPS satellite 401 relative to the communication apparatus 101, a speed in a direction of a line of sight which links the communication apparatus 101 and the GPS satellite 401 to each other affects the Doppler shift amount.

Figure 8:
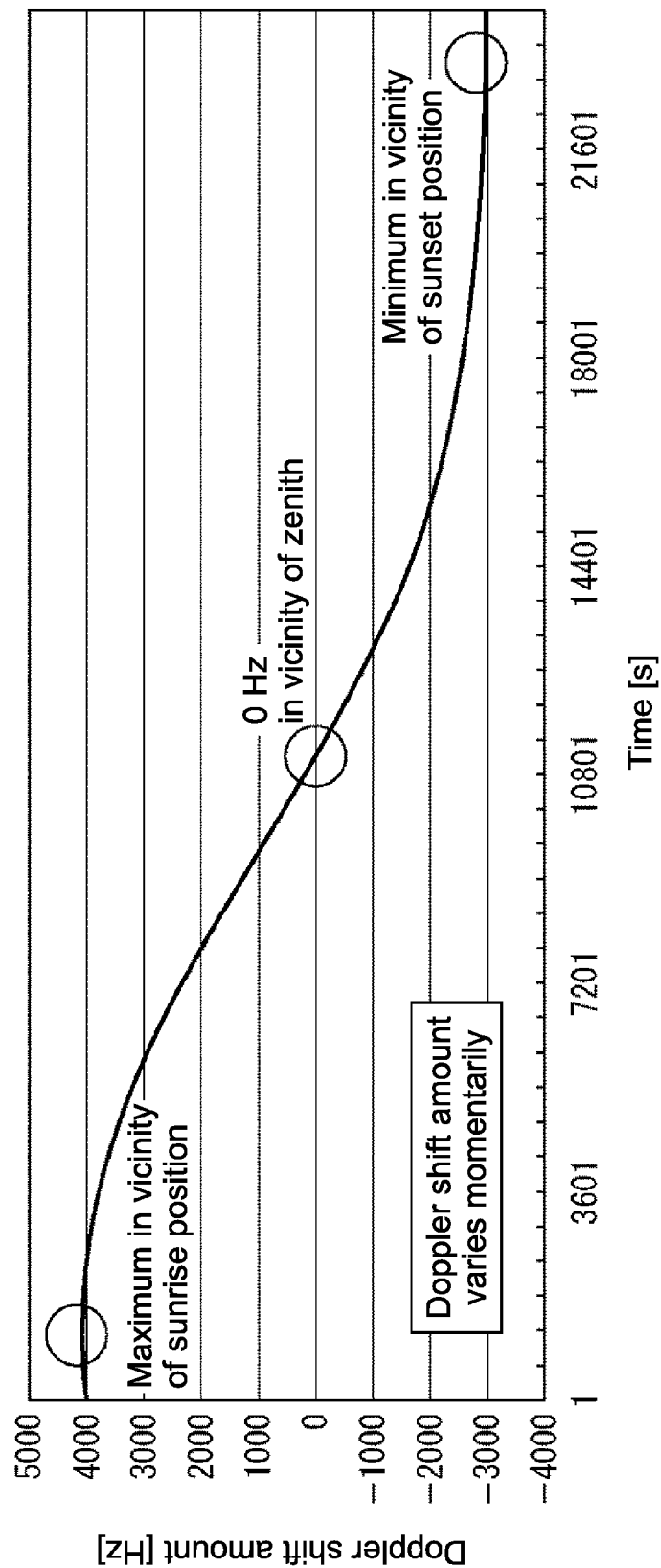
FIG. 8 is a graph showing an example of a transition of the Doppler shift amount.

FIG. 8 is a diagram showing an example of the time-series transition of the Doppler shift amount. A lateral axis of a graph shown in FIG. 8 indicates an elapsed time period (unit: second) from time when the GPS satellite 401 is started to be viewed from the position where the communication apparatus 101 exists, and a vertical line thereof indicates the Doppler shift amount (unit: Hz).

As described above, because the GPS satellite 401 constantly moves when viewed from the communication apparatus 101, the Doppler shift amount varies momentarily. Further, the Doppler shift amount is maximized when the GPS satellite 401 is in the vicinity of a position of sunrise. Here, the position of sunrise refers to a position where the GPS satellite 401 is started to be viewed from the position where the communication apparatus 101 exists. That is, in the vicinity of the position of sunrise, the speed of the GPS satellite 401 in the direction of the line of sight is maximized in a direction of approaching the communication apparatus 101, so the Doppler shift amount is maximized in a direction (positive direction) in which the frequency is increased. Thus, when the GPS satellite 401 exists in the vicinity of the position of sunrise, an apparent frequency of the GPS signal received by the communication apparatus 101 is maximized.

On the other hand, the Doppler shift amount is minimized when the GPS satellite 401 exists in the vicinity of a position of sunset. Here, the position of sunset refers to a position at a time immediately before the GPS satellite 401 goes out of sight from the position where the communication apparatus 101 exists. That is, in the vicinity of the position of sunset, the speed of the GPS satellite 401 in the direction of the line of sight is maximized in a direction away from the communication apparatus 101, to the Doppler shift amount is maximized in a direction (negative direction) in which the frequency is decreased. Therefore, when the GPS satellite 401 exists in the vicinity of the position of sunset, an apparent frequency of the GPS signal received by the communication apparatus 101 is minimized.

In addition, when the GPS satellite 401 exists in the vicinity of the zenith, the Doppler shift amount becomes approximately 0. That is, in the vicinity of the zenith, the speed of the GPS satellite 401 in the direction of the line of sight becomes approximately 0. Therefore, the Doppler shift amount also becomes approximately 0.

The transition of the Doppler shift amount of the GPS signal from the GPS satellite 401 shown in FIG. 8 can be calculated on the basis of the ephemeris data transmitted from the GPS satellite 401.

In view of this, on the basis of the ephemeris data from the GPS satellite to be subjected to the synchronous acquisition, the Doppler shift amount calculation unit 231 obtains, as the initial Doppler shift amount Fds0, the Doppler shift amount of the GPS signal from the GPS satellite at the position and time when the synchronous acquisition is started. Further, the Doppler shift amount calculation unit 231 obtains, as the Doppler shift change amount ΔFds, a change amount per unit time (for example, 1 millisecond) of the Doppler shift amount at the position and time when the synchronous acquisition is started. The Doppler shift change amount ΔFds is represented by an inclination in the graph of FIG. 8 which shows the transition of the Doppler shift amount.

In addition, the Doppler shift amount calculation unit 231 supplies the calculated initial Doppler shift amount Fds0 and the Doppler shift change amount ΔFds to the frequency shift amount setting unit 232 and the sampling interval setting unit 233.

In Step S2, the frequency shift amount setting unit 232 sets the frequency shift amount Fsft to an initial value. Specifically, the frequency shift amount setting unit 232 supplies the intermediate frequency Fif and the initial Doppler shift amount Fds0 to the addition unit 262 of the frequency conversion unit 211. As a result, the frequency shift amount Fsft is set to Fif+Fds0 Further, the frequency shift amount setting unit 232 supplies the sampling frequency Fsmp of the A/D converter 125 to the division unit 263 of the frequency conversion unit 211 and supplies a constant 2π to the multiplication unit 264 of the frequency conversion unit 211.

In Step S3, the frequency conversion unit 211 performs the frequency conversion. That is, through the processing described above with reference to FIG. 3, the frequency conversion unit 211 shifts the frequency of the discretization signal supplied from the noise removal unit 113 by the frequency shift amount Fsft (=Fif+Fds). In addition, the frequency conversion unit 211 supplies the baseband signal obtained by shifting the frequency to the filter 212.

As a result, the frequency of the baseband signal becomes a frequency shifted by the frequency obtained by combining the intermediate frequency Fif and the initial Doppler shift amount Fds0 from the frequency of the original discretization signal. That is, in the frequency conversion unit 211, in addition to the frequency shift by the intermediate frequency Fif, the correction of the Doppler shift is performed. Therefore, the baseband signal is a signal obtained by performing a BPSK modulation for the spectrum spreading signal and has a center frequency of approximately 0 Hz irrespective of the degree of the Doppler shift amount.

In Step S4, the filter 212 performs filtering. That is, the filter 212 removes a harmonic component with a predetermined frequency or more and supplies the baseband signal from which the harmonic component is removed to the down sampling unit 213.

In Step S5, the synchronous acquisition unit 141 performs the down sampling. In the down sampling process, the sampling interval Is is adjusted on the basis of the initial Doppler shift amount Fds0 for the following reason.

Figure 9:
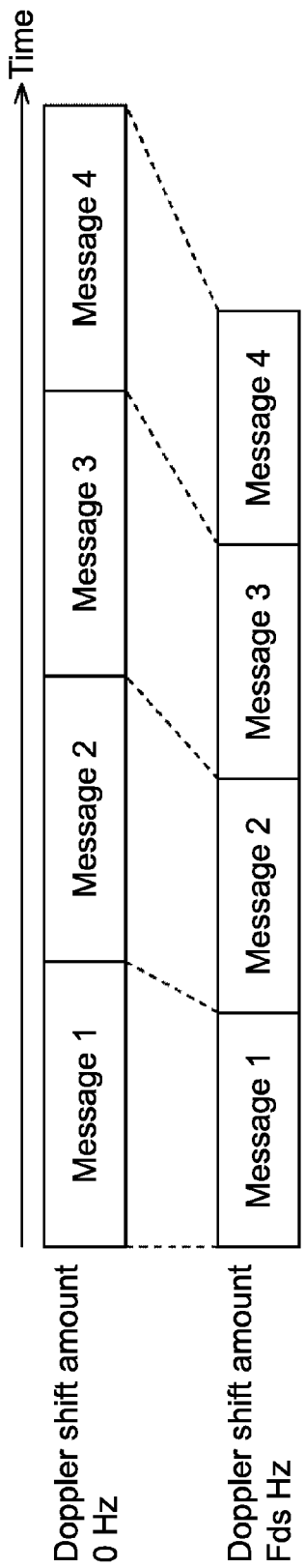
FIG. 9 is a diagram for explaining a change in apparent message length of a GPS signal by the Doppler shift.

Specifically, when the apparent frequency of the GPS signal is changed by the Doppler shift, as shown in FIG. 9, an apparent length of a message contained in the GPS signal on a temporal axis is changed. That is, if the apparent frequency of the GPS signal becomes higher by the Doppler shift, an apparent time period of the message contained in the GPS signal is shortened. On the other hand, because the sampling frequency Fsmp of the A/D converter 125 is constant, the number of bits assigned to the message is decreased, and the message length is shortened.

In contrast, if the apparent frequency of the GPS signal is lowered by the Doppler shift, the apparent time period of the message contained in the GPS signal becomes longer. On the other hand, because the sampling frequency Fsmp of the A/D converter 125 is constant, the number of bits assigned to the message is increased, and the message length becomes longer.

In this way, when the sampling interval is set to be constant irrespective of the change of the message length by the Doppler shift, it may be impossible to perform appropriate down sampling for the baseband signal.

Figure 10:
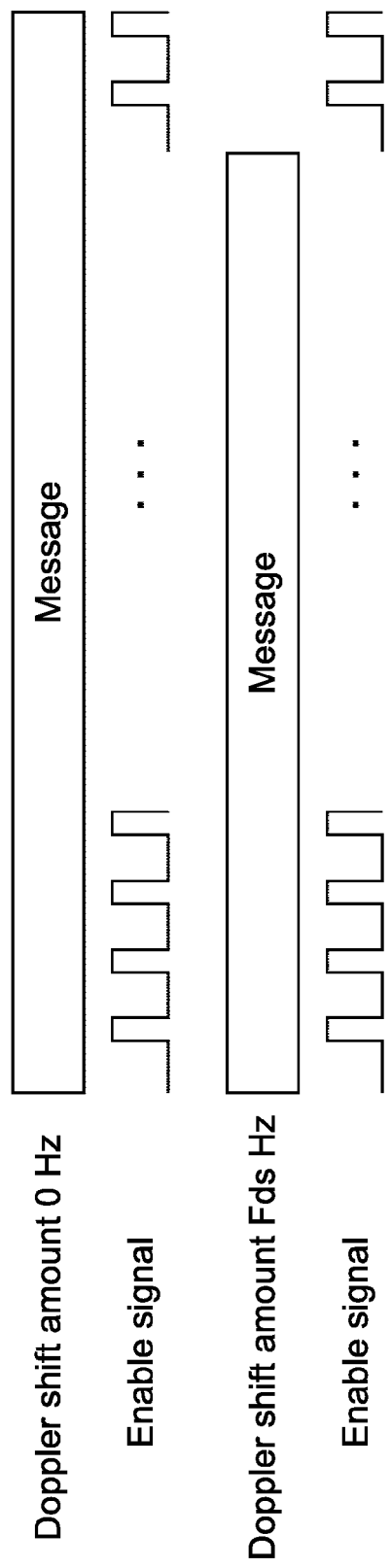
FIG. 10 is a diagram for explaining the change in apparent message length of the GPS signal by the Doppler shift.

Specifically, FIG. 10 is a diagram showing an example in which the down sampling is performed for the same message at the same sampling interval in the case where the Doppler shift is generated and in the case where the Doppler shift is not generated. The upper side of the diagram shows the case where the Doppler shift amount is 0 Hz, that is, the case where the Doppler shift is not generated. The lower side of the diagram shows the case where the Doppler shift amount is Fds Hz (>0 Hz), that is, the case where the Doppler shift is generated in a direction in which the frequency becomes higher.

In the down sampling unit 213, at a timing when the enable signal from the comparator 303 becomes High, the sampling for the baseband signal is performed. Then, as shown in FIG. 10, in the case where the Doppler shift is generated, the number of samplings for the same message is decreased as compared to the case where the Doppler shift is not generated. That is, a leak of information is caused in a message after the down sampling, and the message length becomes shorter, as compared to the case where the Doppler shift is not generated.

On the other hand, although not shown, in the case where the Doppler shift amount is Fds Hz (<0 Hz), that is, in the case where the Doppler shift is generated in a direction in which the frequency is lowered, the number of samplings for the same message is increased as compared to the case where the Doppler shift is not generated. That is, redundancy of information is caused in a message after the down sampling, and the message length becomes longer, as compared to the case where the Doppler shift is not generated.

In this way, due to the Doppler shift, the message length contained in the baseband signal after the down sampling varies. Of course, for the C/A code contained in the baseband signal, a leak of a value and redundancy are also caused due to the Doppler shift, and the length thereof is varied. Further, a peak of the correlation calculation to be described later is difficult to be generated, and therefore the accuracy of the synchronous acquisition is lowered.

In view of this, first, the sampling interval setting unit 233 calculates the count width ΔC from the following expression (1).

$$\Delta C = (Frf + Fds0)/Frf \qquad (1)$$

From the expression (1), in the case where the initial Doppler shift amount Fds0 is 0 Hz, the count width ΔC is set to 1. On the other hand, in the case where the initial Doppler shift amount Fds0>0 Hz is satisfied, and the apparent frequency of the GPS signal becomes higher, the count width ΔC is set to be a value larger than 1. In addition, in the case where the initial Doppler shift amount Fds0<0 Hz is satisfied, and the apparent frequency of the GPS signal is lowered, the count width ΔC is set to a value smaller than 1.

Then, the sampling interval setting unit 233 supplies the count width ΔC to the addition unit 301 of the down sampling unit 213 and supplies the reference sampling interval Is0 to the subtraction unit 302 of the down sampling unit 213.

The addition unit 301 supplies the count value C obtained by adding the buffer value B of the buffer 305 and the count width ΔC to the subtraction unit 302, the comparator 303, and the selector 304 in synchronization with a sampling period of the A/D converter 125.

The subtraction unit 302 subtracts the reference sampling interval Is0 from the count value C and supplies a subtraction value C−Is0 thus obtained to the selector 304.

In the case where the count value C is less than the reference sampling interval Is0, the comparator 303 sets the enable signal value to 0. In the case where the count value C is equal to or more than the reference sampling interval Is0, the comparator 303 sets the enable signal value to 1.

In the case where the value of the enable signal is 0, the selector 304 supplies the count value C to the buffer 305 and causes the buffer 305 to hold the value. On the other hand, in the case where the value of the enable signal is 1, the selector 304 supplies the subtraction value C−Is0 to the buffer 305 and causes the buffer 305 to hold the value.

The sampling unit 306 does not output a value when the enable signal is 0, and outputs a value of the baseband signal when the enable signal becomes 1.

In this way, the down sampling for the baseband signal is performed.

Here, a relationship between the Doppler shift amount and the actual sampling interval Is in the case where the reference sampling interval Is0 is set to 16 bits will be described with reference to FIGS. 11 to 13.

Figure 11:
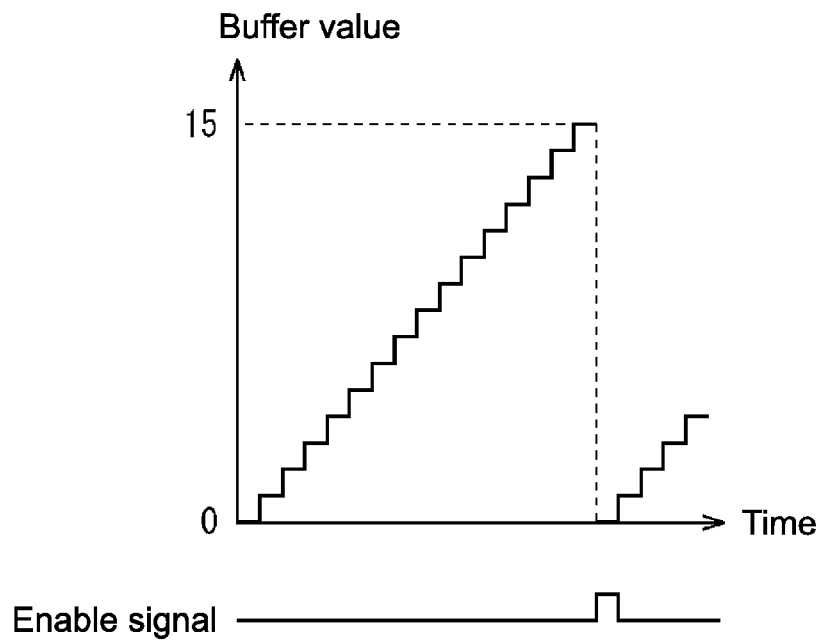
FIG. 11 is a diagram for explaining a relationship between the Doppler shift amount and a sampling interval of down sampling.

For example, in the case where the Doppler shift is not generated, and the count width ΔC is set to 1, as shown in FIG. 11, the buffer value B is reset to 0, and then the buffer value and the count value C are each increased by 1 each time the baseband signal progresses by 1 bit (1 sample). After that, at a time when the baseband signal reaches the 16th bit, the buffer value B becomes 15. Then, at a time when the baseband signal reaches the 17th bit, the count value C becomes 16, and the enable signal value is set to 1. As a result, the value of the baseband signal at the 17th bit is sampled.

After that, a value obtained by subtracting 16 (=reference sampling interval Is0) from the count value C, that is, 0 is supplied to the buffer 305, and the buffer value B is reset to 0. After that, the same loop process is repeated, and the baseband signal is sampled at intervals of 16 bits equal to the reference sampling interval Is0. Therefore, the sampling frequency of the baseband signal after the down sampling is Fsmp/Is0(=Fsmp/16).

Figure 12:
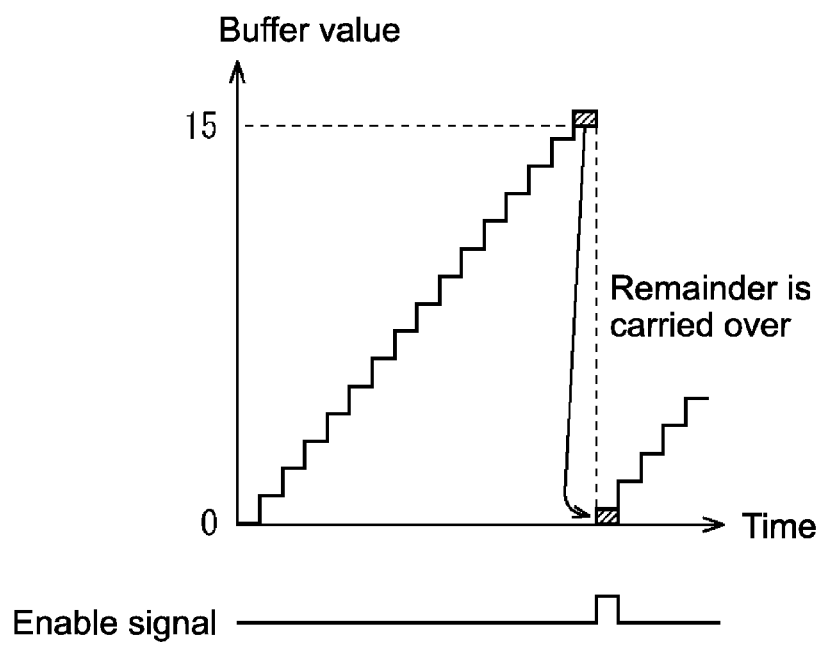
FIG. 12 is a diagram for explaining a relationship between the Doppler shift amount and the sampling interval of the down sampling.

On the other hand, in the case where the initial Doppler shift amount Fds0>0 is satisfied, and the count width ΔC is set to a value larger than 1, as shown in FIG. 12, after the buffer value B is reset to 0, the buffer value B and the count value C are increased by ΔC each time the baseband signal progresses by 1 bit (1 sample). Then, at a time when the baseband signal reaches the 16th bit, the buffer value B exceeds 15. When the baseband signal reaches the 17th bit, the count value C exceeds 16, and the value of the enable signal is set to 1. As a result, a value of the baseband signal at the 17th bit is sampled.

After that, a remainder R generated by subtracting 16 (=reference sampling interval Is0) from the count value C is supplied to the buffer 305 and is carried over to the next loop process. That is, in the next loop process, the counting is started from the remainder R. Therefore, each time the sampling is performed for the baseband signal, the initial value of the buffer value B of the loop process is increased, the case where the sampling interval is shortened to 15 bits is caused. As a result, an average value of the sampling interval Is becomes shorter than 16 bits.

Figure 13:
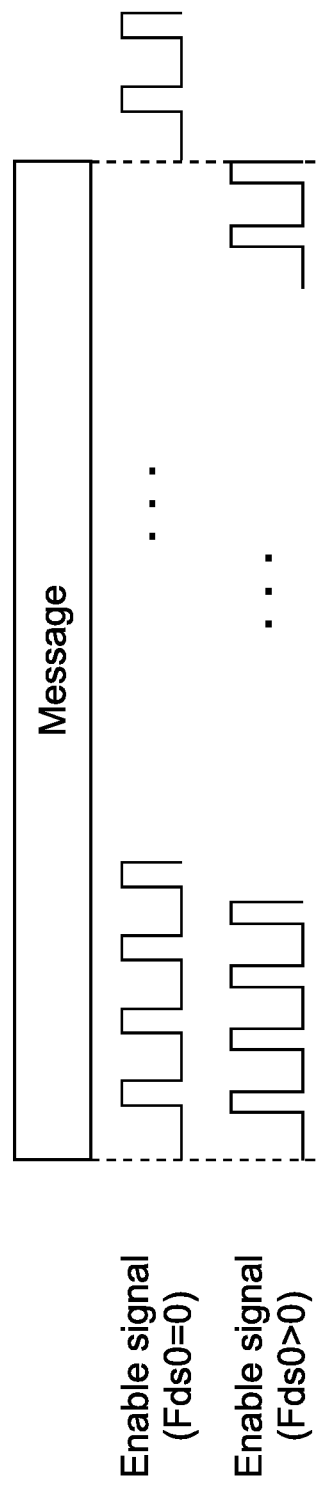
FIG. 13 is a diagram for explaining a relationship between the Doppler shift amount and the sampling interval of the down sampling.

FIG. 13 is a schematic diagram showing a comparison between output intervals of the enable signal in the case where the initial Doppler shift amount Fds0=0 is established and in the case of the initial Doppler shift amount Fds0>0 is satisfied. As described above, in the case where the initial Doppler shift amount Fds0>0 is satisfied, the output interval of the enable signal becomes shorter, with the result that the sampling interval Is is shortened.

In contrast, although not shown, in the case where the initial Doppler shift amount Fds0<0 is satisfied, the output interval of the enable signal becomes longer, with the result that the sampling interval Is is increased.

Eventually, the average value of the sampling interval Is becomes Is0/ΔC (=16/ΔC). That is, the average value of the sampling interval Is is 1/ΔC (=Frf/(Frf+Fds0)) times the reference sampling interval Is0 in the case where the Doppler shift is not generated. Further, the sampling frequency of the baseband signal after the down sampling is (Fsmp/Is0)*ΔC (=(Fsmp/16)*ΔC). That is, the sampling frequency of the baseband signal after the down sampling is ΔC times the value in the case where the Doppler shift is not generated.

In this way, in accordance with the initial Doppler shift amount Fds0, the sampling interval Is is adjusted, so the information relating to the C/A code contained in the baseband signal after the down sampling is prevented from being leaked, and the redundancy thereof is prevented from being caused.

Returning to FIG. 5, in Step S6, the coherent addition unit 214 performs the coherent addition. Specifically, the coherent addition unit 214 performs the coherent addition for the baseband signal after the down sampling on the 1023-bit basis. That is, the coherent addition unit 214 holds data of the baseband signal of 1023 bits which is supplied from the down sampling unit 213 as it is in a first process of Step S6. In a second and subsequent process of Step S6, the coherent addition unit 214 adds the next 1023-bit data of the baseband signal after the down sampling to the 1023-bit data held. As a result, a detection sensitivity of the peak of the correlation calculation to be described later is increased.

In Step S7, the controller 202 determines whether the coherent addition is performed a predetermined number of times or not. In the case where it is determined that the coherent addition is not performed the predetermined number of times, the process proceeds to Step S8.

In Step S8, the frequency shift amount setting unit 232 updates the frequency shift amount Fsft. Specifically, the frequency shift amount setting unit 232 supplies the intermediate frequency Fif and the initial Doppler shift amount Fds0 to the addition unit 262 of the frequency conversion unit 211 and supplies the Doppler shift change amount ΔFds to the integrator 261 of the frequency conversion unit 211.

As a result, in a first process of Step S8, the frequency shift amount Fsft is set to Fif+Fds0+ΔFds. In the following, in the same way, in an n-th process of Step S8, the frequency shift amount Fsft is set to Fif+Fds0+n*ΔFds.

After that, the process returns to Step S3. Until it is determined that the coherent addition is performed the predetermined number of times in Step S7, the process of Steps S3 to S8 is repeatedly performed. That is, while updating the frequency shift amount Fsft, the frequency conversion of the discretization signal, the down sampling of the baseband signal after the frequency conversion, and the coherent addition of the baseband signal after the down sampling are repeated.

In addition, the frequency shift amount Fsft is updated so as to be increased by the Doppler shift change amount ΔFds each time the coherent addition is performed. In other words, on the basis of the initial Doppler shift amount Fds0 and the Doppler shift change amount ΔFds, the change in the Doppler shift amount with respect to the movement of the GPS satellite during execution of the synchronous acquisition process is predicted. To follow the change, the frequency shift amount Fsft is adjusted. Therefore, at the time when the synchronous acquisition is started, it is possible to perform the correction of the Doppler shift of the discretization signal more accurately as compared to the case where the Doppler shift amount is fixed.

On the other hand, in Step S7, in the case where it is determined that the coherent addition is performed for the predetermined number of times, the process proceeds to Step S9.

In Step S9, the phase detection unit 216 detects the phase of the C/A code. Specifically, the coherent addition unit 214 supplies the coherent addition data obtained by the coherent addition to the correlation calculation unit 221.

The PN generation unit 215 generates the C/A code of the GPS satellite to be subjected to the synchronous acquisition and supplies the C/A code of each phase to the correlation calculation unit 221 while shifting the phase of the generated C/A code on 1-chip basis.

The correlation calculation unit 221 performs the correlation calculation of the coherent addition data and the C/A code of each phase and supplies a correlation value thus obtained to the peak detection unit 222.

When detecting a peak where the correlation value is a predetermined threshold value or more, the peak detection unit 222 detects the kind and phase of the C/A code at that time. Further, the peak detection unit 222 detects the GPS satellite as the transmission source of the GPS signal, which has been subjected to the synchronous acquisition, from the kind of the detected C/A code. Then, the peak detection unit 222 supplies the phase of the C/A code detected and the apparatus identification information that indicates the GPS satellite detected to the synchronous holding unit 142 and the MPU 143.

On the other hand, in the case where the peak where the correlation value is the predetermined threshold value or more is not detected, the peak detection unit 222 determines that the received GPS signal is not transmitted from the GPS satellite as the synchronous acquisition target.

After that, the synchronous acquisition process is terminated. It should be noted that the synchronous acquisition process is continued with another GPS satellite as a target when necessary.

As described above, the change in the Doppler shift amount during the synchronous acquisition is predicted, and the correction amount of the Doppler shift is adjusted so as to follow the change, so the detection accuracy of the peak of the correlation value is improved. As a result, the accuracy of the synchronous acquisition is improved.

Figure 14:
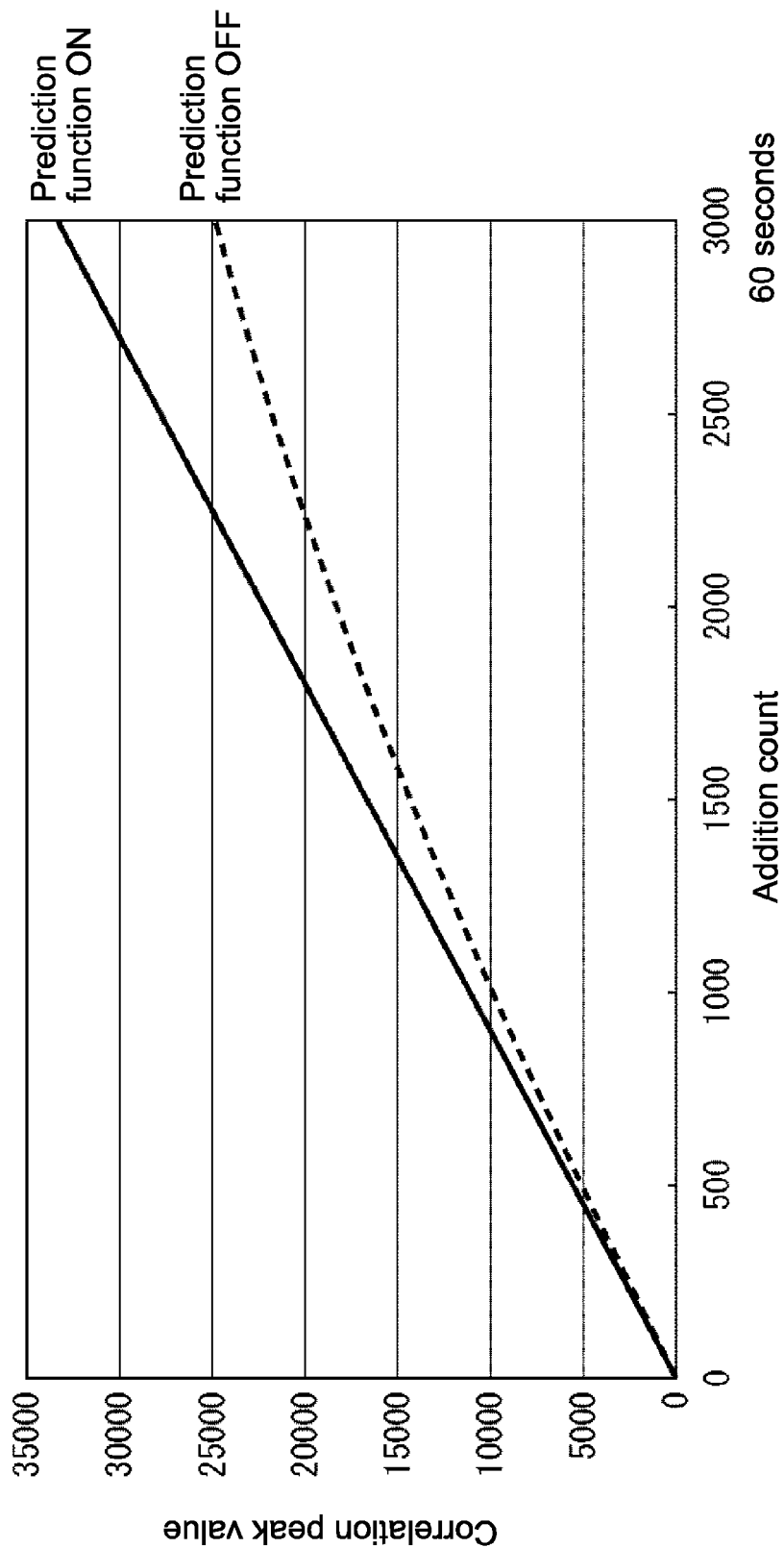
FIG. 14 is a graph showing a comparison between correlation peak values in the case where a prediction function for a change in the Doppler shift amount is set to on and in the case where the prediction function is set to off.

FIG. 14 is a graph showing a comparison between the peak values of the correlation values (correlation peak values) by the correlation calculation unit 221 in the case where a prediction function for the change in the Doppler shift amount during the synchronous acquisition is set to on and in the case where the prediction function is set to off. A lateral axis indicates the number of times of the coherent addition, and a vertical axis indicates the correlation peak value.

As shown in FIG. 14, in the case where the prediction function is on, the correlation peak value becomes larger as compared to the case where the prediction function is off. Therefore, in the case where the prediction function is on, it is possible to detect the phase of the C/A code of the GPS signal more accurately. Alternatively, in the case where the prediction function is on, it is possible to detect the phase of the C/A code of the GPS signal by fewer coherent additions and thus reduce a time period necessary for the synchronous acquisition.

In addition, in accordance with the initial Doppler shift amount Fds0, the sampling interval Is of the down sampling is adjusted, so the detection accuracy of the peak of the correlation value is improved. As a result, the accuracy of the synchronous acquisition is improved. Alternatively, it is possible to detect the phase of the C/A code of the GPS signal by fewer coherent additions, and reduce the time period necessary for the synchronous acquisition.

In addition, to set the frequency shift amount Fsft and the sampling interval Is of the down sampling, it is unnecessary to perform complicate calculations and processes. Thus, it is possible to improve the accuracy of the synchronous acquisition without complicating the structure and process of the communication apparatus 101.

<2. Modified Example>

Hereinafter, a modified example of the embodiment of the present disclosure will be described.

For example, the intermediate frequency conversion unit 122 can be omitted, and the GPS signal can be processed with the carrier frequency thereof maintained without converting the signal to the intermediate frequency.

Further, for example, the coherent addition unit 214 can be omitted, and the coherent addition of the baseband signal can be performed without performing the down sampling.

Further, for example, the frequency conversion unit 211 of the synchronous acquisition unit 141 may be disposed in front of the A/D converter 125. That is, for the analog signal before subjected to the A/D conversion, the correction of the Doppler shift may be performed with the use of the frequency shift amount Fsft set by the frequency shift amount setting unit 232.

In addition, for example, on the basis of the initial Doppler shift amount Fds0 and the Doppler shift change amount ΔFds, instead of predicting the change in the Doppler shift amount, at a timing when the frequency shift amount Fsft is updated, a latest Doppler shift amount may be calculated each time on the basis of the ephemeris data, the position and current time of the communication apparatus 101, and the like.

Further, in the above description, each time the coherent addition is performed once, the frequency shift amount Fsft is updated. However, from when the coherent addition is started until ended, the frequency shift amount Fsft may be updated one or more times at other timings. For example, the frequency shift amount Fsft may be updated each time the coherent addition is performed predetermined n times, or the frequency shift amount Fsft may be updated each time a predetermined time period elapses.

Further, in the above description, the sampling interval Is of the down sampling is set once in the one synchronous acquisition process and is not updated. However, like the frequency shift amount Fsft, the sampling interval Is may be updated so as to follow the change in the Doppler shift amount.

Further, the present technology can be applied not only to a single communication apparatus that uses the GPS but also to various apparatuses provided with the communication apparatus which uses the GPS, such as a navigation system, a smartphone, and a mobile phone.

In addition, the present technology can be applied to a communication apparatus that uses a satellite navigation system (such as GLONASS, Galileo, and Compass) other than the GPS and various apparatuses provided with the communication apparatus.

Further, the present technology can be applied to a communication apparatus that uses such a system that a position of a transmission side relative to a reception side is changed, thereby generating the Doppler shift, and a movement of the relative position of the transmission side can be predicted by the reception side and various apparatuses provided with the communication apparatus.

(Example of Structure of Computer)

The series of processes described above can be performed by hardware or software. In the case where the series of processes are performed by the software, programs that constitute the software are installed in a computer. Examples of the computer include a computer incorporated in dedicated hardware, a general-purpose personal computer capable of executing various functions by installing various programs, and the like.

Figure 15:
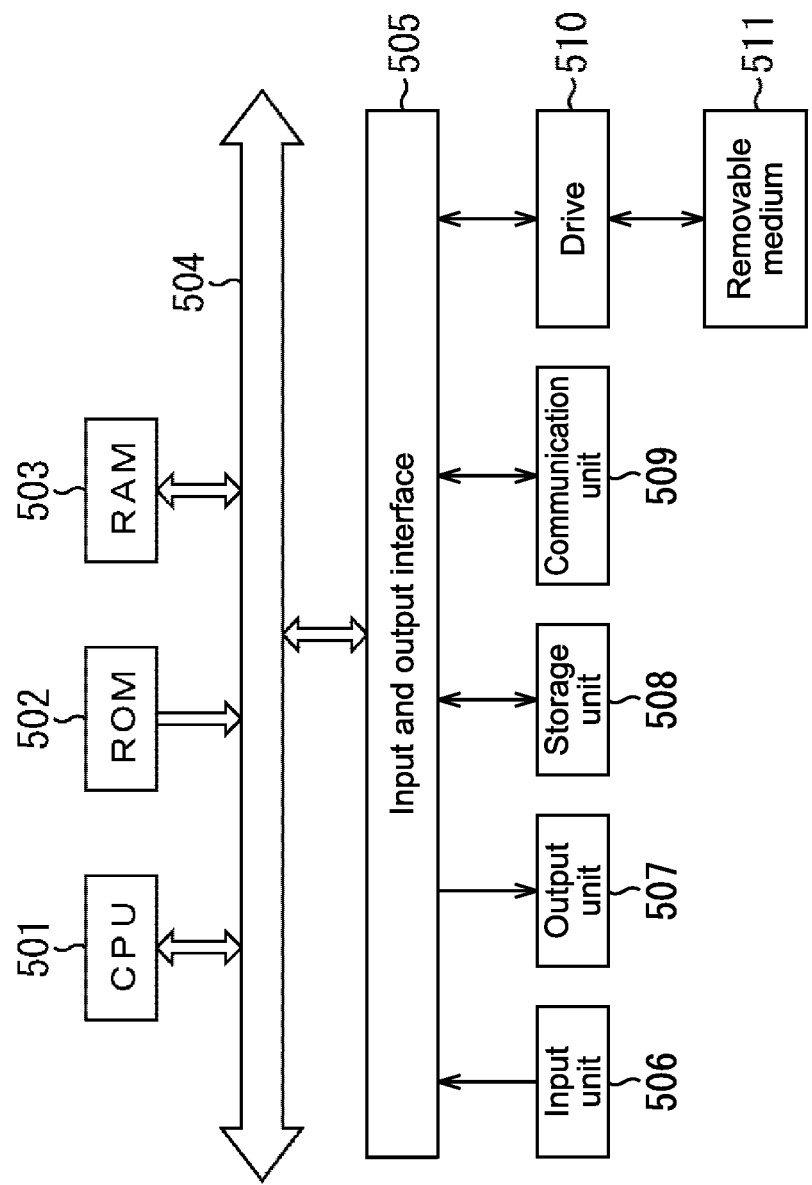
FIG. 15 is a block diagram showing an example of the structure of a computer.

FIG. 15 is a block diagram showing an example of the hardware structure of a computer that executes the series of processes described above by programs.

In the computer, a CPU (central processing unit) 501, a ROM (read only memory) 502, and a RAM (random access memory) 503 are connected to each other via a bus 504.

To the bus 504, an input and output interface 505 is further connected. To the input and output interface 505, an input unit 506, an output unit 507, a storage unit 508, a communication unit 509, and a drive 510 are connected.

The input unit is formed of a keyboard, a mouse, a microphone, or the like. The output unit 507 is formed of a display, a speaker, or the like. The storage unit 508 is formed of a hard disk, a non-volatile memory, or the like. The communication unit 509 is formed of a network interface or the like. The drive 510 drives a removable medium 511 such as a magnetic disk, an optical disk, a magneto-optical disk, and a semiconductor memory.

In the computer having the structure as described above, the CPU 501 loads a program stored in the storage unit 508 to the RAM 503 via the input and output interface 505 and the bus 504 and executes the program, thereby executing the series of processes described above.

The program executed by the computer (CPU 501) can be provided by being recorded in the removable medium 511 as a package medium or the like, for example. Further, the program can be provided via a wired or wireless transmission medium, such as a local area network, the Internet, and a digital satellite broadcast.

In the computer, the program can be installed in the storage unit 508 via the input and output interface 505 by loading the removable medium 511 to the drive 510. Further, the program can be received by the communication unit 509 via a wired or wireless transmission medium and installed in the storage unit 508. In addition, the program can be installed in advance in the ROM 502 or the storage unit 508.

It should be noted that the program executed by the computer may be a program, the processes of which are performed in a chronological order along the description order in the specification, or may be a program, the processes of which are performed in parallel or at necessary timings when being called, for example.

Further, in the specification, the system refers to a set of a plurality of components (apparatuses, modules (parts), and the like). Whether all the components are in the same casing or not is not considered. Therefore, both of a plurality of apparatuses stored in separate casings and connected via a network and one apparatus having a plurality of modules stored in one casing are systems.

Further, the present disclosure is not limited to the above embodiment and can be variously modified without departing from the gist of the present disclosure.

For example, the present disclosure can have the structure of cloud computing in which one function is shared by a plurality of apparatuses via a network and processed in cooperation with each other.

Further, the steps described in the flowchart described above can be executed by one apparatus or by a plurality of apparatuses in a sharing manner.

Further, in the case where one step includes a plurality of processes, the plurality of processes in the one step can be performed by one apparatus or shared by a plurality of apparatus.

It should be noted that the present disclosure can take the following configurations.

(1) A communication apparatus, including:

a Doppler shift amount calculation unit configured to calculate a Doppler shift amount of a reception signal which is received from an artificial satellite and is obtained by modulating a signal, for which spectrum spreading is performed by using a predetermined spread code, by a predetermined carrier frequency;

a sampling interval setting unit configured to set a sampling interval, at which down sampling is performed for the reception signal that is subjected to A/D conversion, on the basis of the Doppler shift amount calculated;

a down sampling unit configured to perform the down sampling for the reception signal that is subjected to the A/D conversion at the sampling interval set;

a coherent addition unit configured to perform coherent addition of the reception signal that is subjected to the down sampling;

a spread code generation unit configured to generate a spread code; and a phase detection unit configured to perform correlation calculation between a calculation result of the coherent addition and the spread code generated and detect a phase of the spread code of the reception signal on the basis of a result of the correlation calculation.

(2) The communication apparatus according to Item (1), in which the sampling interval setting unit sets an average value of the sampling interval to be (the carrier frequency/(the carrier frequency+the Doppler shift amount)) times the sampling interval in the case where a Doppler shift is not generated.

(3) The communication apparatus according to Item (2), in which the sampling interval setting unit sets a count width to be (the carrier frequency+the Doppler shift amount)/the carrier frequency, and the down sampling unit integrates a count value by the count width for each sample of the reception signal, performs sampling of the reception signal when the count value becomes equal to or larger than a predetermined value, and starts counting from a remainder obtained by subtracting the predetermined value from the count value.

(4) The communication apparatus according to any one of Items (1) to (3), further including:
a frequency shift amount setting unit configured to set a frequency shift amount for shifting a frequency of the reception signal on the basis of the Doppler shift amount calculated; and
a frequency conversion unit configured to shift the frequency of the reception signal by the frequency shift amount set, in which
the down sampling unit performs the down sampling for the reception signal the frequency of which is shifted.

(5) The communication apparatus according to Item (4), further including
an A/D conversion unit configured to perform the A/D conversion for the reception signal, in which
the frequency conversion unit shifts the frequency of the reception signal for which the A/D conversion is performed.

(6) The communication apparatus according to Item (5), further including
an intermediate frequency conversion unit configured to convert the frequency of the reception signal from the carrier frequency to a predetermined intermediate frequency, in which
the A/D conversion unit performs the A/D conversion for the reception signal the frequency of which is converted to the intermediate frequency, and
the frequency conversion unit shifts the frequency of the reception signal, for which the A/D conversion is performed, by a frequency obtained by combining the intermediate frequency and the Doppler shift amount.

It should be understood by those skilled in the art that various modifications, combinations, sub-combinations and alterations may occur depending on design requirements and other factors insofar as they are within the scope of the appended claims or the equivalents thereof.

What is claimed is:

1. A communication apparatus, comprising:
a Doppler shift amount calculation unit configured to calculate a Doppler shift amount of a reception signal which is received from an artificial satellite and is obtained by modulating a signal, for which spectrum spreading is performed by using a predetermined spread code, by a predetermined carrier frequency;
a sampling interval setting unit configured to set a sampling interval, at which down sampling is performed for the reception signal that is subjected to A/D conversion, on the basis of the Doppler shift amount calculated;
a down sampling unit configured to perform the down sampling for the reception signal that is subjected to the A/D conversion at the sampling interval set;
a coherent addition unit configured to perform coherent addition of the reception signal that is subjected to the down sampling;
a spread code generation unit configured to generate a spread code; and
a phase detection unit configured to perform correlation calculation between a calculation result of the coherent addition and the spread code generated and detect a phase of the spread code of the reception signal on the basis of a result of the correlation calculation,
wherein the sampling interval setting unit sets an average value of the sampling interval to be (the carrier frequency/(the carrier frequency +the Doppler shift amount)) times the sampling interval in the case where a Doppler shift is not generated.

2. The communication apparatus according to claim 1, wherein
the sampling interval setting unit sets a count width to be (the carrier frequency +the Doppler shift amount)/the carrier frequency, and
the down sampling unit integrates a count value by the count width for each sample of the reception signal, performs sampling of the reception signal when the count value becomes equal to or larger than a predetermined value, and starts counting from a remainder obtained by subtracting the predetermined value from the count value.

3. The communication apparatus according to claim 1, further comprising:
a frequency shift amount setting unit configured to set a frequency shift amount for shifting a frequency of the reception signal on the basis of the Doppler shift amount calculated; and
a frequency conversion unit configured to shift the frequency of the reception signal by the frequency shift amount set, wherein
the down sampling unit performs the down sampling for the reception signal the frequency of which is shifted.

4. The communication apparatus according to claim 3, further comprising an A/D conversion unit configured to perform the A/D conversion for the reception signal, wherein
the frequency conversion unit shifts the frequency of the reception signal for which the A/D conversion is performed.

5. The communication apparatus according to claim 4, further comprising
an intermediate frequency conversion unit configured to convert the frequency of the reception signal from the carrier frequency to a predetermined intermediate frequency, wherein
the A/D conversion unit performs the A/D conversion for the reception signal the frequency of which is converted to the intermediate frequency, and
the frequency conversion unit shifts the frequency of the reception signal, for which the A/D conversion is performed, by a frequency obtained by combining the intermediate frequency and the Doppler shift amount.

6. A communication apparatus comprising:
a Doppler shift amount calculation unit configured to calculate a Doppler shift amount of a reception signal received from a satellite;
an A/D converting unit configured to perform A/D conversion on the reception signal;
a down sampling unit configured to perform down sampling on the A/D converted reception signal at a sampling interval;
a sampling interval setting unit configured to set a value of the sampling interval based on the calculated Doppler shift amount;
a coherent addition unit configured to perform coherent addition of the down sampled reception signal;
a spread code generation unit configured to generate a spread code; and
a phase detection unit configured to perform correlation calculation between a calculation result of the coherent addition and the generated spread code and detect a phase of the spread code of the reception signal on the basis of a result of the correlation calculation.

7. The communication apparatus according to claim 6, wherein the sampling interval setting unit sets the sampling interval such that an average value of the sampling interval equals $I_0 \cdot (f_c + f_d)/f_c$, where $I_0$ is a reference sampling interval, $f_c$ is a carrier frequency of the reception signal, and $f_d$ is the calculated Doppler shift amount.

8. The communication apparatus according to claim 7,
wherein the down sampling unit performs the down sampling by:
iteratively integrating a count value by a count width,
sampling the reception signal when the count value becomes equal to or larger than $I_0$, and
when the reception signal has been sampled, setting the count value to a remainder value that is obtained by subtracting 1 from a most recent instance of the count value, and wherein the sampling interval setting unit sets the sampling interval by setting the count width to be $(f_c+f_d)/f_c$.

\* \* \* \* \*